United States Patent
Nicholls et al.

(10) Patent No.: US 8,885,285 B1
(45) Date of Patent: Nov. 11, 2014

(54) IMPACT DETECTION FOR DATA STORAGE DEVICE

(71) Applicant: Western Digital Technologies, Inc., Irvine, CA (US)

(72) Inventors: Michael T. Nicholls, Laguna Hills, CA (US); Hien T. Chu, Fountain Valley, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/033,136

(22) Filed: Sep. 20, 2013

Related U.S. Application Data (60) Provisional application No. 61/857,491, filed on Jul. 23, 2013.

(51) Int. Cl.
- G11B 21/06 (2006.01)
- G11B 19/02 (2006.01)
- G11B 33/14 (2006.01)

(52) U.S. Cl.
CPC ..................................... G11B 33/14 (2013.01)
USPC ............... 360/75; 360/69; 702/141; 73/12.06

(58) Field of Classification Search
None
See application file for complete search history.

(56) References Cited

U.S. PATENT DOCUMENTS

| | | | |
|---|---|---|---|
| 5,546,806 A | 8/1996 | Kain | |
| 6,104,153 A | 8/2000 | Codilian et al. | |
| 6,549,359 B1 | 4/2003 | Bennett et al. | |
| 6,768,066 B2 | 7/2004 | Wehrenberg | |
| 7,059,182 B1 | 6/2006 | Ragner | |
| 7,071,597 B2 | 7/2006 | Lee et al. | |
| 7,161,758 B2 | 1/2007 | Adapathya et al. | |
| 7,191,089 B2 | 3/2007 | Clifford et al. | |
| 7,281,522 B1 | 10/2007 | Sato et al. | |
| 7,307,228 B2 | 12/2007 | Wehrenberg | |
| 7,369,345 B1 | 5/2008 | Li et al. | |
| 7,382,576 B2 | 6/2008 | Okada et al. | |
| 7,397,626 B2 | 7/2008 | Aoki et al. | |
| 7,477,469 B2 | 1/2009 | Cook et al. | |
| 7,499,232 B2 | 3/2009 | Hodge et al. | |
| 7,525,750 B2 | 4/2009 | Aoki et al. | |
| 7,525,751 B2 | 4/2009 | Han et al. | |
| 7,541,551 B2 | 6/2009 | Wehrenberg | |
| 7,663,833 B2 | 2/2010 | Aoki et al. | |
| 7,667,743 B2 | 2/2010 | Uchida et al. | |
| 7,690,253 B2 | 4/2010 | Noda et al. | |
| 7,706,097 B2 | 4/2010 | Kuroki et al. | |
| 7,747,818 B1 | 6/2010 | Overby | |
| 7,751,142 B2 | 7/2010 | Karakas | |
| 7,752,351 B1 | 7/2010 | Overby | |
| 7,782,563 B2 | 8/2010 | Han et al. | |
| 7,802,476 B2 | 9/2010 | Lasalandra et al. | |
| 7,865,253 B2 | 1/2011 | Harrington | |
| 8,245,573 B2 | 8/2012 | Lammel | |
| 8,345,025 B2 | 1/2013 | Seibert et al. | |

(Continued)

*Primary Examiner* — Andrew L Sniezek (57) ABSTRACT

Detecting an impact of an electronic device, such as a data storage device (DSD). An acceleration input is received indicating an acceleration of the electronic device and it is determined whether an acceleration change value based on the acceleration input is greater than an absolute threshold. If so, an acceleration change ratio is calculated using the acceleration change value and an average of acceleration change values. The acceleration change ratio is compared to a relative threshold and it is determined that an impact of the electronic device has been detected if the acceleration change ratio is greater than the relative threshold.

20 Claims, 5 Drawing Sheets

(56) References Cited

U.S. PATENT DOCUMENTS

| | | |
|---|---|---|
| 8,363,344 B2 | 1/2013 | Lin et al. |
| 8,408,041 B2 | 4/2013 | Ten Kate et al. |
| 2005/0213242 A1 | 9/2005 | Fujiki et al. |
| 2006/0070439 A1 | 4/2006 | Kwon et al. |
| 2007/0223123 A1 | 9/2007 | Karakas |
| 2009/0205406 A1* | 8/2009 | Tachibana et al. ........... 73/12.06 |
| 2011/0215940 A1 | 9/2011 | Bartholomeyczik et al. |
| 2012/0324980 A1 | 12/2012 | Nguyen et al. |
| 2013/0054180 A1 | 2/2013 | Barfield |
| 2013/0107394 A1 | 5/2013 | Lin et al. |
| 2013/0120147 A1 | 5/2013 | Narasimhan et al. |

\* cited by examiner

IMPACT DETECTION FOR DATA STORAGE DEVICE

CROSS-REFERENCE TO RELATED APPLICATION

This application claims the benefit of U.S. Provisional Application No. 61/857,491, filed on Jul. 23, 2013, which is hereby incorporated by reference in its entirety.

BACKGROUND

Data storage devices (DSDs) are often used by electronic devices to record data onto or to reproduce data from a recording media. As electronic devices become increasingly mobile, the risk of mechanical shock to a DSD increases from events such as when the electronic device is dropped. In order to prevent damage to the DSD, some DSDs may take precautionary measures before impact if it is sensed that the electronic device or DSD is falling. In the example of a DSD including a rotating magnetic disk as a recording media, a magnetic head may be moved away from the disk during a fall to prevent contact between the head and the disk at impact after the fall. Such contact between the head and the disk may result in damage to the disk and loss of data stored on the disk.

The increasing mobility and increasing physical movement of electronic devices such as tablet computers have also made it more difficult to accurately determine when a DSD is in a falling state as opposed to some other type of motion which might provide a false indication of falling. A false indication of falling may, for example, result from walking or running with the electronic device or may result from movement of the electronic device as part of a particular application such as a gaming application. False indications of falling can degrade performance of the electronic device due to unnecessary preventative measures taken by the DSD such as moving a head away from a disk during a false fall. On the other hand, the failure to take precautionary measures during an actual fall can result in severely damaging the DSD and/or losing data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
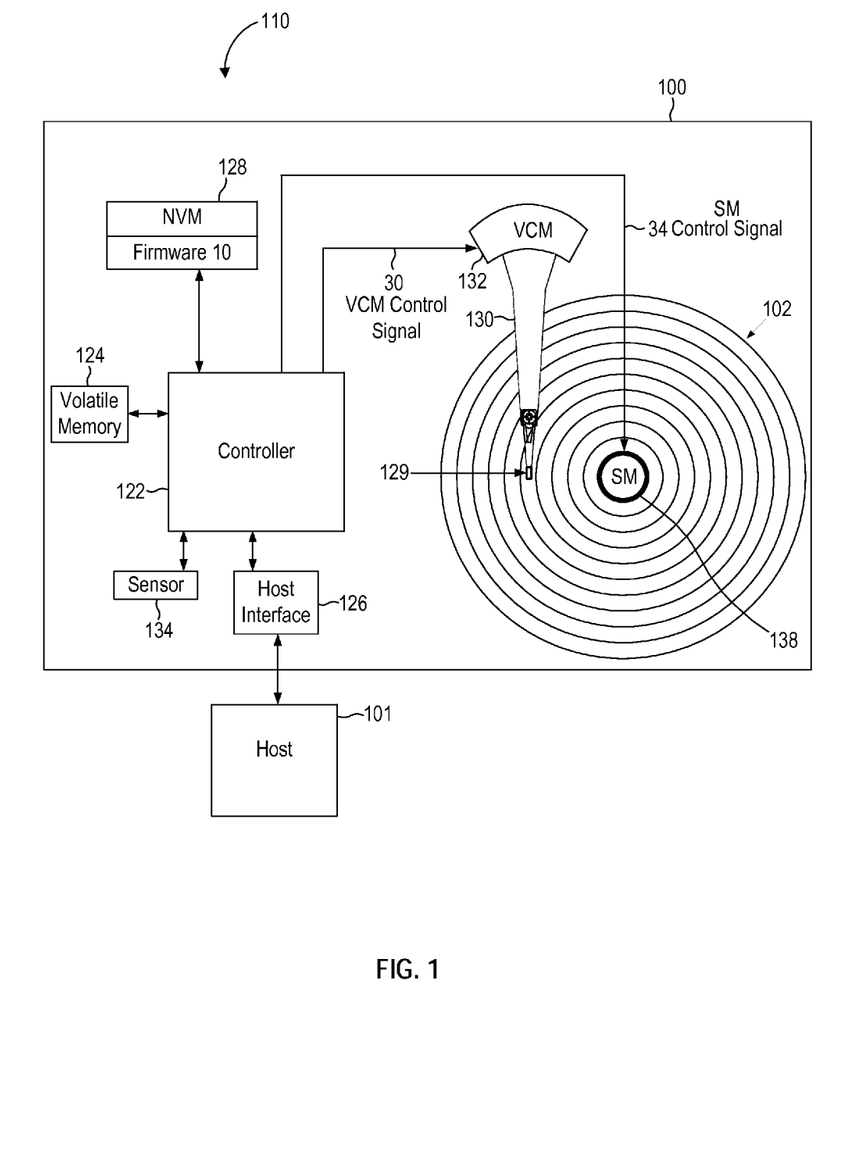
FIG. 1 is a block diagram depicting an electronic device according to an embodiment.

FIG. 1 illustrates a block diagram of electronic device 110 including data storage device (DSD) 100 in communication with host 101 according to one example embodiment. Electronic device 110 can be a computer system (e.g., desktop, mobile/laptop, tablet, smartphone, etc.) or other electronic device such as a digital video recorder (DVR). Those of ordinary skill in the art will appreciate that electronic device 110 and DSD 100 can include more or less than those elements shown in FIG. 1.

In one embodiment, DSD 100 includes controller 122 which can perform an impact detection process as described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 1, DSD 100 includes rotating magnetic disk 102 and head 129 connected to the distal end of actuator 130 which is rotated by voice coil motor (VCM) 132 to position head 129 over disk 102. Head 129 includes at least a read element (not shown) for reading data from disk 102, and a write element (not shown) for writing data on disk 102.

Disk 102 comprises a number of radial spaced, concentric tracks for storing data and can form part of a disk pack (not shown) which can include additional disks below disk 102.

With reference to FIG. 1, DSD 100 may also optionally include solid-state non-volatile memory (NVM) 128 for storing data, for example, for use as a cache or as part of a solid state hybrid drive (SSHD) implementation of DSD 100. NVM 128 stores firmware 10 which can include computer-readable instructions used by DSD 100 to implement the impact detection process described below.

While the description herein refers to solid-state NVM generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Volatile memory 124 can include, for example, a DRAM. Data stored in volatile memory 124 can include data read from disk 102, data to be written to disk 102, and/or instructions for DSD 100, such as instructions loaded into volatile memory 124 from firmware 10.

Host interface 126 is configured to interface DSD 100 with host 101 and may interface according to a standard such as, for example, PCI express (PCIe), serial advanced technology attachment (SATA), or serial attached SCSI (SAS). As will be appreciated by those of ordinary skill in the art, interface 126 can be included as part of controller 122. Although FIG. 1 depicts the co-location of host 101 and DSD 100, in other embodiments the two need not be physically co-located. In such embodiments, DSD 100 may be located remotely from host 101 and connected to host 101 via a network interface. In other embodiments, DSD 100 may serve as a stand-alone DSD without host 101 or may be temporarily disconnected from host 101.

DSD 100 also includes spindle motor (SM) 138 for rotating disk 102 when writing data to disk 102 or reading data from disk 102. SM 138 and VCM 132 are connected to controller 122 which includes control circuitry such as a servo controller to control SM 138 and VCM 132 with VCM control signal 30 and SM control signal 34, respectively. These control signals can be, for example, control currents for controlling the rotation of VCM 132 and SM 138.

Sensor 134 is configured to detect acceleration of DSD 100 and can include, for example, an XYZ sensor with three degrees of freedom. In other embodiments, sensor 134 can include a sensor with six degrees of freedom such as an XYZ-YPR sensor. The detected acceleration can be input to controller 122 to determine when DSD 100 is in a falling state. For example, sensor 134 may detect that DSD 100 is in a free-fall state or that DSD 100 is in a tipping-drop state where DSD 100 rotates about an axis while at least a portion of DSD 100 drops. Controller 122 may then implement protective measures to prevent damage to DSD 100 before impact. In particular, controller 122 can control VCM 132 via VCM control signal 30 to move head 129 away from disk 102 in an attempt to avoid contact between head 129 and disk 102 during an impact. Contact between head 129 and disk 102 can result in damage to disk 102 and loss of data stored on disk 102.

In other embodiments, sensor 134 may be part of host 101 in electronic device 110. In such embodiments, the input of sensor 134 may be received by controller 122 via host interface 126.

As noted above, a false indication of falling can degrade performance of an electronic device such as electronic device 110 due to unnecessary precautionary measures taken by DSD 100 such as moving head 129 away from disk 102 during a false fall. The impact detection process disclosed below therefore ordinarily provides a way to distinguish between actual falls and false indications of falling.

Figure 2:
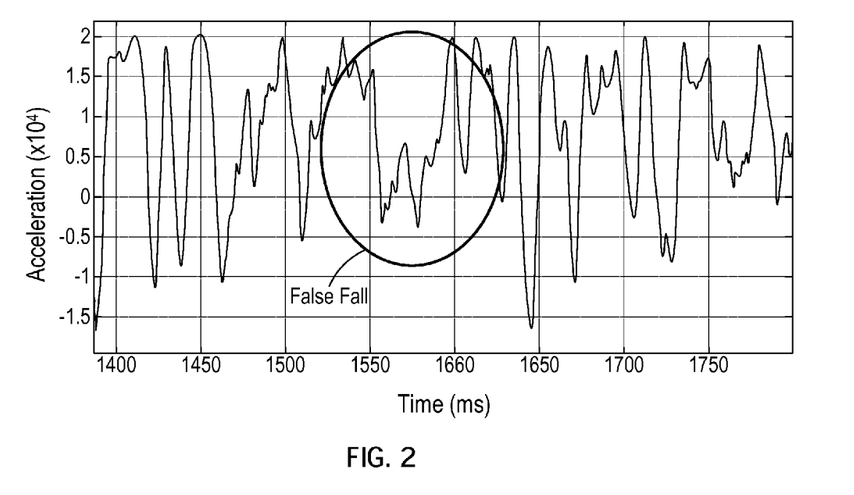
FIG. 2 is a graph depicting acceleration of a data storage device (DSD) during a false fall according to an embodiment.

FIG. 2 is a graph depicting an acceleration input to controller 122 from sensor 134 indicating an acceleration of DSD 100 during a false fall according to one embodiment. In the example of FIG. 2, the acceleration input represents a count output by sensor 134 corresponding to an acceleration detected in one dimension (e.g., in an x, y or z dimension). As shown in FIG. 2, the region circled as a "false fall" might indicate a fall using conventional algorithms of fall detection given the changes or differences in acceleration depicted in this region. FIG. 2 also shows that the time before the false fall region as well as the time after the false fall region show similar changes or differences in acceleration of DSD 100. These similar changes in acceleration surrounding the false fall region can generally be used to better differentiate between false falls and actual falls. More specifically, the adjacent changes in acceleration can indicate a period of vibration of DSD 100 resulting from a particular condition of electronic device 110 (e.g., motion due to walking or running of a user) or from a particular application executed by electronic device 110 (e.g., haptic feedback or motion sensitive gaming).

Figure 3:
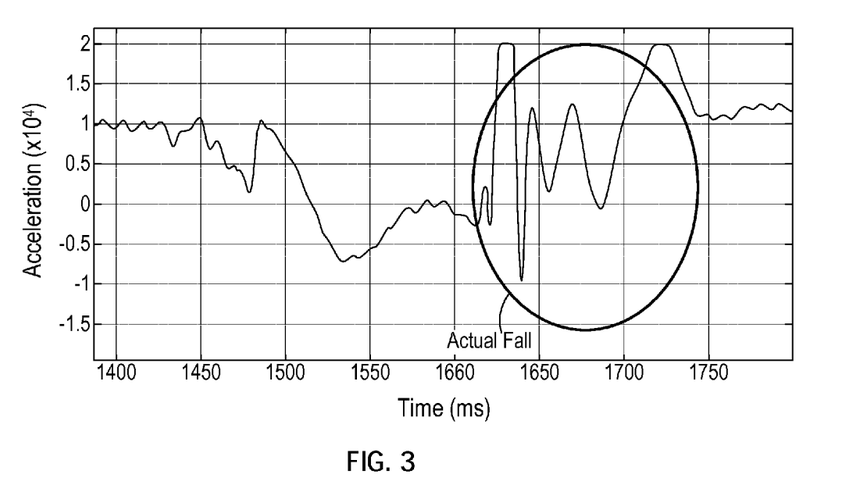
FIG. 3 is a graph depicting acceleration of a DSD during an actual fall according to an embodiment.

The graph of FIG. 3 depicts acceleration of DSD 100 during an actual fall according to an embodiment. As shown in FIG. 3, there is a significant change in acceleration for the region indicated as an "actual fall" which results from a dropping of electronic device 110 and a subsequent mechanical shock experienced by DSD 100 after impact.

In comparison to the false fall of FIG. 2, the actual fall of FIG. 3 does not include as many large changes in acceleration adjacent to the actual fall region. The following impact detection process of FIG. 4 takes advantage of this difference in acceleration changes to identify false falls for adjusting a fall detection sensitivity of DSD 100.

Figure 4:
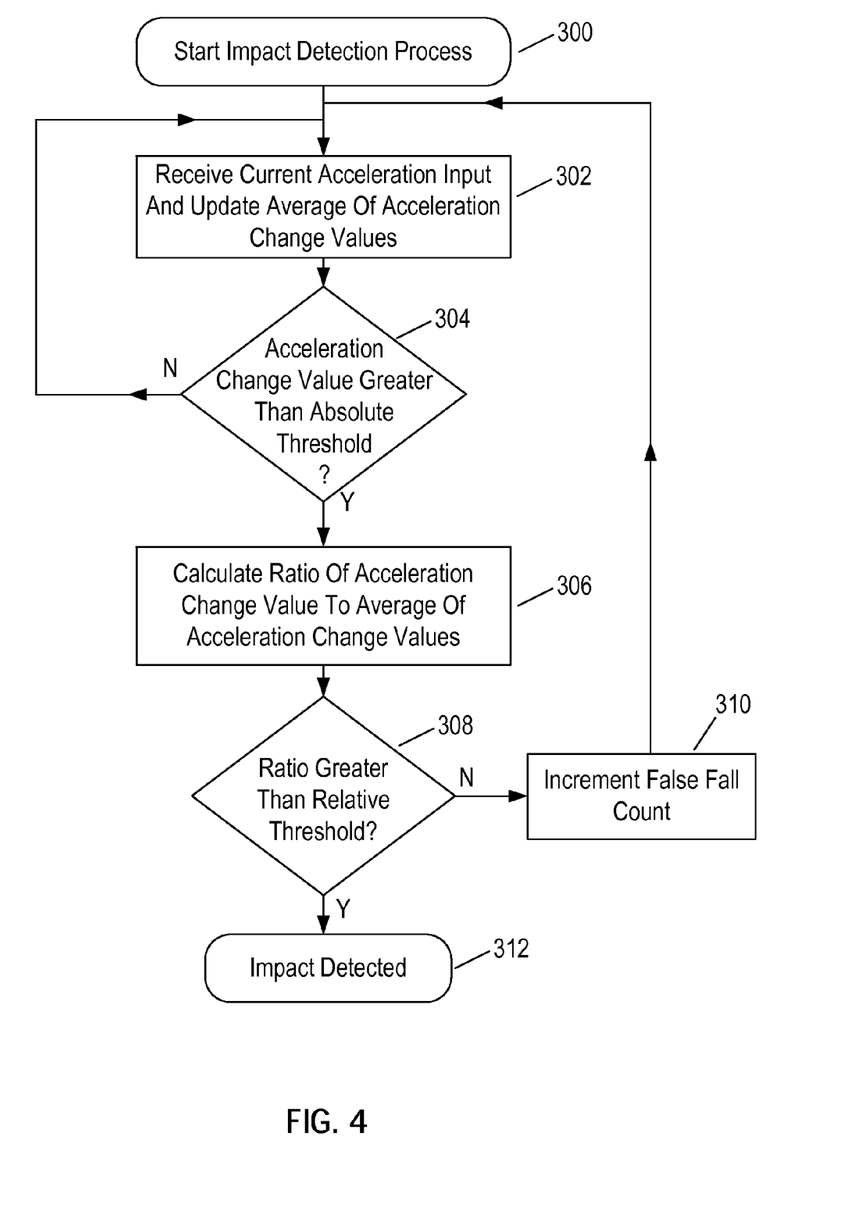
FIG. 4 is a flowchart for an impact detection process according to an embodiment.

FIG. 4 is a flowchart for an impact detection process which can be performed by controller 122 of DSD 100 according to one embodiment. In block 300, the impact detection process begins. In one embodiment, this may occur whenever head 129 is positioned over disk 102.

Figure 5:
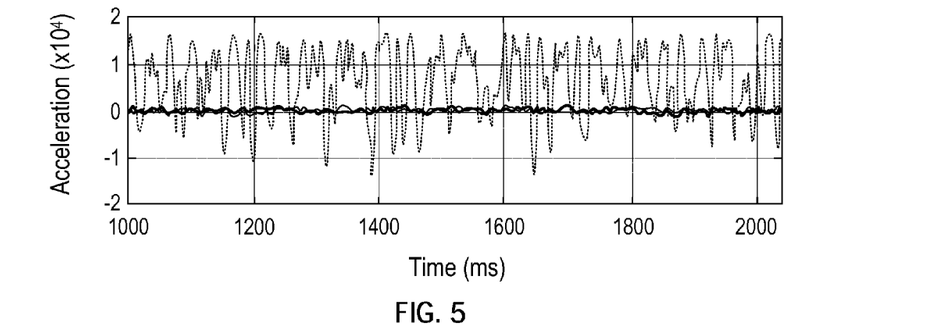
FIG. 5 is a graph depicting acceleration for a DSD during a false fall according to an embodiment.
Figure 8:
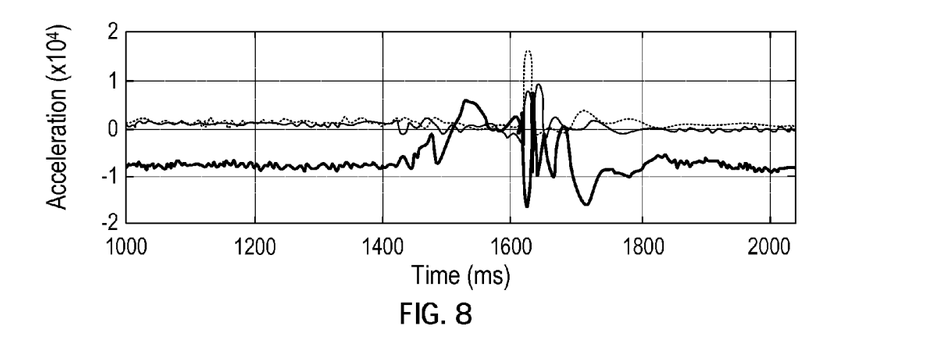
FIG. 8 is a graph depicting acceleration for a DSD during an actual fall according to an embodiment.

In block 302, controller 122 receives an acceleration input from sensor 134 for a specific time or specific period of time (i.e., a current acceleration input). In an implementation where sensor 134 is an XYZ sensor, the acceleration input can include three values indicating an acceleration in each of three different dimensions. Such an example is shown in the embodiments of FIGS. 5 and 8, where the bold line indicates an acceleration in an x dimension, the other solid line indicates an acceleration in a y dimension, and the dotted line indicates an acceleration in a z dimension. As with FIGS. 2 and 3, the accelerations depicted in FIGS. 5 and 8 can represent the acceleration input which can be a count output by sensor 134.

Returning to FIG. 4, controller 122 also calculates an acceleration change value and updates an average of acceleration change values in block 302 based on the acceleration input. In an implementation where sensor 134 is an XYZ sensor, the acceleration change value can be represented as a "jerk vector" or change in acceleration in x, y and z dimensions. The jerk vector can be expressed as shown below:

$$\Delta a = (x_1 - x_0, y_1 - y_0, z_1 - z_0) \qquad \text{Eq. 1}$$

where $x_1$, $y_1$ and $z_1$ represent accelerations in each of three dimensions for the current acceleration input and $x_0$, $y_0$ and $z_0$ represent accelerations at a previous time which can be based on a previous acceleration input. The previous acceleration input may be stored, for example, in volatile memory 124 of DSD 100. In one implementation, the difference between the time for the current acceleration input and the previous acceleration input can be 1 ms.

In a different implementation, the acceleration change value can be calculated as the L1 norm of the jerk vector. Using the example of Equation 1 above for the jerk vector, the L1 norm can be expressed as shown below in Equation 2.

$$L1 \text{ norm} = \Sigma_{axes} |\Delta a| \qquad \text{Eq. 2}$$

In yet other implementations, the acceleration change value can be calculated as the L2 norm or the root-mean square of the jerk vector.

Controller 122 updates the average of acceleration change values in block 302 using the acceleration change value. For example, when the acceleration change value is calculated as an L1 norm of the jerk vector, the average of acceleration change values can be based on an average L1 norm of the jerk vector over a period of time such as 100 ms. This average of acceleration change values can be expressed as shown below.

$$\text{Average of Acceleration Change Values} = \overline{\Sigma axes |\Delta a|} \qquad \text{Eq. 3}$$

The average of acceleration change values may be approximated using a 1st order infinite impulse response (IIR) low pass filter in one implementation to weight more recent acceleration change values more heavily in calculating the average. Weighting more recent acceleration change values more heavily can allow for a more accurate determination of a false fall since more recent changes in acceleration can better indicate whether a current change in acceleration is a continuation of a false fall motion such as vibration.

In block 304, controller 122 determines whether the current acceleration change value for DSD 100 is greater than an absolute threshold. In the example above where the acceleration change value is the jerk vector, the absolute threshold may be a change in acceleration set for each of the dimensions detected by sensor 134. For example, in an implementation where sensor 134 is an XYZ sensor, the absolute threshold may be a fraction of the gravitational acceleration constant G in each of the three dimensions detected by sensor 134.

If using the L1 norm as the acceleration change value, the absolute threshold can be the L1 norm of thresholds in each of the dimensions detected by sensor 134. The absolute threshold may then be calculated to correspond to specific design criteria, for example, based on a fraction of the gravitational constant.

Figure 6:
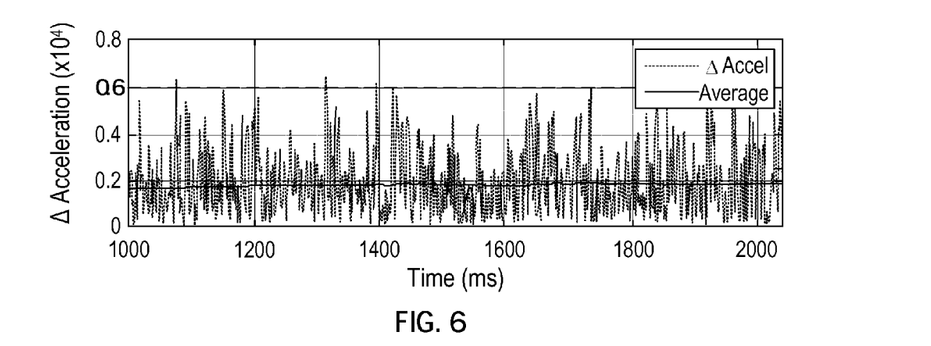
FIG. 6 is a graph depicting acceleration change values and an average of acceleration change values during the false fall of FIG. 5 according to an embodiment.
Figure 9:
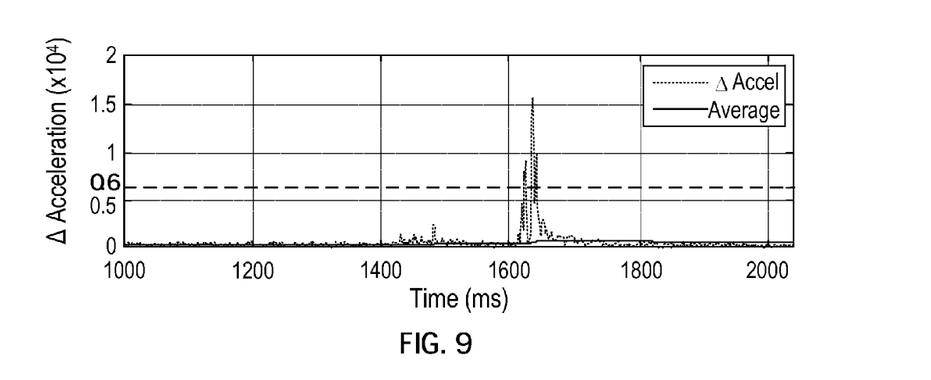
FIG. 9 is a graph depicting acceleration change values and an average of acceleration change values during the actual fall of FIG. 8.

FIG. 6 depicts acceleration change values (ΔAcceleration) and an average of acceleration change values corresponding to the false fall of FIG. 5 according to an embodiment. FIG. 9 depicts acceleration change values and an average of acceleration change values corresponding to the actual fall of FIG. 8 according to an embodiment. The absolute threshold in each of FIGS. 6 and 9 has been set to $0.6 \times 10^4$ as indicated by the horizontal bold dashed line. As shown in FIG. 6, there are several instances spread out over the time period where the change in acceleration is greater than the absolute threshold. In the example of FIG. 9, there are also instances where the change in acceleration is greater than the absolute threshold but these instances are closer together which can be more indicative of an actual fall.

Returning to FIG. 4, if it is determined in block 304, that the acceleration change value is not greater than the absolute threshold, the process returns to block 302 to receive another current acceleration input and update the average of acceleration change values.

On the other hand, if it is determined that the acceleration change value is greater than the absolute threshold, controller 122 in block 306 calculates a ratio of the acceleration change value to the average of acceleration change values updated in block 302. Using Equations 2 and 3 above as an example, this ratio can be expressed as shown in Equation 4 below.

$$\text{Ratio} = \Sigma axes |\Delta a| / \overline{\Sigma axes |\Delta a|} \qquad \text{Eq. 4}$$

In one implementation, the division in the ratio of Equation 4 may be implemented using a count leading zeros (CLZ) operation. In the example of Equation 4, the ratio is dimensionless and is independent of sampling rates for sensor 134.

The ratio calculated in block 306 is compared to a relative threshold in block 308 to determine whether the change in acceleration is due to an actual fall or a false fall.

Figure 7:
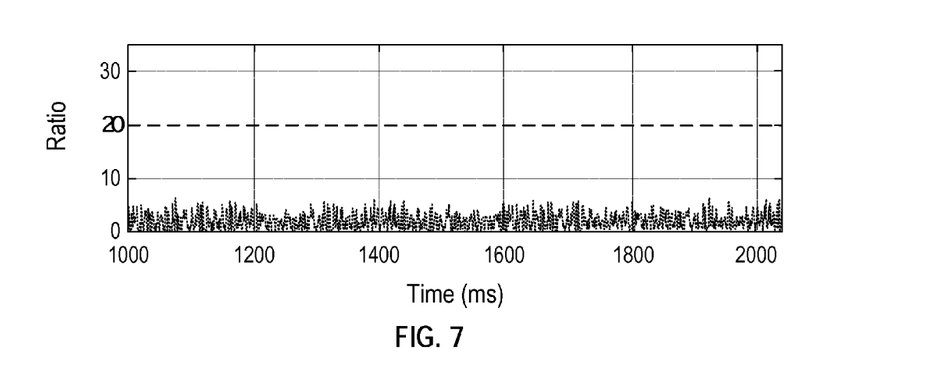
FIG. 7 is a graph depicting an acceleration change ratio during the false fall of FIGS. 5 and 6 according to an embodiment.

FIG. 7 depicts an example acceleration change ratio during the false fall of FIGS. 5 and 6 according to an embodiment. In this example, the relative threshold has been set to 20 as indicated by the dashed line in FIG. 7. The ratio during the time period from 1,000 ms to 2,000 ms shown in FIG. 7 does not reach the relative threshold even though there are large changes in acceleration shown in FIG. 5 and the acceleration change values in FIG. 6 are greater than the absolute threshold at several times during the same period. This is due to considering the average of acceleration change values and can ordinarily result in differentiation between actual falls and false falls.

Figure 10:
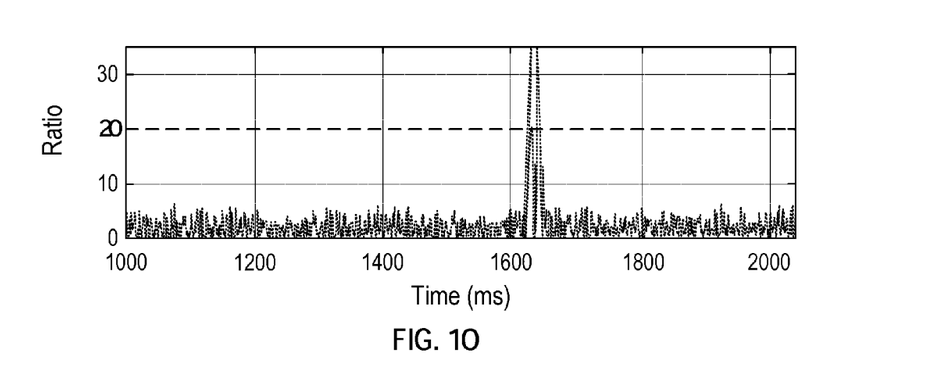
FIG. 10 is a graph depicting an acceleration change ratio during the actual fall of FIGS. 8 and 9 according to an embodiment.

In contrast to the graph of FIG. 7, the graph of FIG. 10 depicts an example acceleration change ratio during the actual fall of FIGS. 8 and 9. As shown in FIG. 10, the ratio spikes over the threshold of 20 at slightly after 1,600 ms. This increase in the ratio over the relative threshold indicates an actual fall. As shown in FIG. 9, the changes in acceleration before and after this time (e.g., at 1,400 ms and at 1,800 ms) are generally not as extreme as the changes in acceleration shown throughout the false fall acceleration changes of FIG. 6.

Returning to FIG. 4, controller 122 increments a false fall count in block 310 if the ratio is not greater than the relative threshold in block 308 (as in the example of FIG. 7) and the impact detection process returns to block 302 to receive another current acceleration input from sensor 134.

The false fall count may be stored, for example, in volatile memory 124. A record of false falls can be used for initiating a dormant mode to change the sensitivity for fall detection of DSD 100. After exceeding the limit for false falls, such as three false falls, controller 122 can enter a dormant mode where a modification is made to a fall detection process so that the fall detection process becomes less sensitive to changes in acceleration in determining whether DSD 100 is in a falling state.

An example of a fall detection process can be found in application Ser. No. 14/033,048, filed on Sep. 20, 2013, which is hereby incorporated by reference in its entirety. In such a fall detection process, an initial acceleration threshold can be decreased so that a lower acceleration is needed in the dormant mode to initially indicate a possible falling state. A weighting of a classifier function used to confirm a falling state may also be adjusted in the dormant mode to decrease the sensitivity of the fall detection process. As will be appreciated by those of ordinary skill in the art, other ways of changing fall detection sensitivity are possible.

With reference to FIG. 4, if controller 122 determines in block 308 that the ratio is greater than the relative threshold (as in the example of FIG. 10 after 1,600 ms), then controller 122 determines that an impact has been detected in block 312.

The detection of an impact can be used by controller 122 to confirm that a falling event has ended and to terminate a fall detection cycle. The detection of an impact can also be used as a trigger to move head 129 back over disk 102. Thus, in addition to distinguishing between false falls and actual falls, the foregoing impact detection process can further serve to prevent a premature return to normal operation during an actual fall before impact occurs. For example, where electronic device 110 is a laptop, the lid of an open laptop can wobble during a fall and may trigger a premature end to a fall detection process in a conventional system. The impact detection process disclosed above can typically avoid such a premature detection of impact by considering the average of acceleration change values.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD) comprising:
   a memory for storing data; and
   a controller configured to:
      receive an acceleration input indicating an acceleration of the DSD;
      determine whether an acceleration change value based on the acceleration input is greater than an absolute threshold; and
      when it is determined that the acceleration change value is greater than the absolute threshold:
         calculate an acceleration change ratio using the acceleration change value and an average of acceleration change values;
         compare the acceleration change ratio to a relative threshold; and
         determine that an impact of the DSD has been detected if the acceleration change ratio is greater than the relative threshold.

2. The DSD of claim 1, wherein the controller is further configured to increment a false fall count if the acceleration change ratio is not greater than the relative threshold.

3. The DSD of claim 2, wherein the controller is further configured to:
   determine whether the false fall count exceeds a false fall limit; and
   reduce a fall detection sensitivity of the DSD if the false fall count exceeds the false fall limit by at least changing a weighting of a function used to confirm a falling state of the DSD.

4. The DSD of claim 1, wherein the controller is further configured to calculate the acceleration change value as an L1 norm of acceleration values from the acceleration input.

5. The DSD of claim 1, wherein the controller is further configured to calculate the acceleration change value as an L2 norm of acceleration values from the acceleration input.

6. The DSD of claim 1, wherein the controller is further configured to calculate the average of acceleration change values by weighting more recent acceleration change values more heavily than less recent acceleration change values.

7. The DSD of claim 1, further comprising a sensor for providing the acceleration input to the controller.

8. The DSD of claim 1, wherein the controller receives the acceleration input from a host in communication with the DSD.

9. A method for detecting an impact of an electronic device, the method comprising:
   receiving an acceleration input indicating an acceleration of the electronic device;
   determining whether an acceleration change value based on the acceleration input is greater than an absolute threshold; and
   when it is determined that the acceleration change value is greater than the absolute threshold:
      calculating an acceleration change ratio using the acceleration change value and an average of acceleration change values;
      comparing the acceleration change ratio to a relative threshold; and
      determining that an impact of the electronic device has been detected if the acceleration change ratio is greater than the relative threshold.

10. The method of claim 9, further comprising incrementing a false fall count if the acceleration change ratio is not greater than the relative threshold.

11. The method of claim 10, further comprising:
   determining whether the false fall count exceeds a false fall limit; and
   if the false fall count exceeds the false fall limit, reducing a fall detection sensitivity of the electronic device by at least changing a weighting of a function used to confirm a falling state of the electronic device.

12. The method of claim 9, further comprising calculating the acceleration change value as an L1 norm of acceleration values from the acceleration input.

13. The method of claim 9, further comprising calculating the acceleration change value as an L2 norm of acceleration values from the acceleration input.

14. The method of claim 9, further comprising calculating the average of acceleration change values by weighting more recent acceleration change values more heavily than less recent acceleration change values.

15. A non-transitory computer-readable medium storing computer-executable instructions for detecting an impact of an electronic device, wherein when the computer-executable instructions are executed by a processor or a controller, the computer-executable instructions cause the processor or controller to:
   receive an acceleration input indicating an acceleration of the electronic device;
   determine whether an acceleration change value based on the acceleration input is greater than an absolute threshold; and
   when it is determined that the acceleration change value is greater than the absolute threshold:
      calculate an acceleration change ratio using the acceleration change value and an average of acceleration change values;
      compare the acceleration change ratio to a relative threshold; and
      determine that an impact of the electronic device has been detected if the acceleration change ratio is greater than the relative threshold.

16. The non-transitory computer-readable medium of claim 15, wherein when the computer-executable instructions are executed by the processor or the controller, the computer-executable instructions further cause the processor or controller to increment a false fall count if the acceleration change ratio is not greater than the relative threshold.

17. The non-transitory computer-readable medium of claim 16, wherein when the computer-executable instructions are executed by the processor or the controller, the computer-executable instructions further cause the processor or controller to:
   determine whether the false fall count exceeds a false fall limit; and
   if the false fall count exceeds the false fall limit, reduce a fall detection sensitivity of the electronic device by at least changing a weighting of a function used to confirm a falling state of the electronic device.

18. The non-transitory computer-readable medium of claim 15, wherein when the computer-executable instructions are executed by the processor or the controller, the computer-executable instructions further cause the processor or controller to calculate the acceleration change value as an L1 norm of acceleration values from the acceleration input.

19. The non-transitory computer-readable medium of claim 15, wherein when the computer-executable instructions are executed by the processor or the controller, the computer-executable instructions further cause the processor or controller to calculate the acceleration change value as an L2 norm of acceleration values from the acceleration input.

20. The non-transitory computer-readable medium of claim 15, wherein when the computer-executable instructions are executed by the processor or the controller, the computer-executable instructions further cause the processor or controller to calculate the average of acceleration change values by weighting more recent changes in acceleration change values more heavily than less recent acceleration change values.

* * * * *